United States Patent
Cartwright et al.

(10) Patent No.: US 6,438,171 B1
(45) Date of Patent: Aug. 20, 2002

(54) METHOD AND APPARATUS FOR MODIFYING TABLES OF DATA

(75) Inventors: Charles Cartwright; Giles Wilson; Christopher Caines, all of Hampshire (GB)

(73) Assignee: Tandberg Television ASA, N-Lysaker (NO)

( * ) Notice: Subject to any disclaimer, the term of this patent is extended or adjusted under 35 U.S.C. 154(b) by 0 days.

(21) Appl. No.: 09/308,448

(22) PCT Filed: Nov. 14, 1997

(86) PCT No.: PCT/GB97/03142

§ 371 (c)(1),
(2), (4) Date: Jun. 11, 1999

(87) PCT Pub. No.: WO98/23093

PCT Pub. Date: May 28, 1998

(30) Foreign Application Priority Data

Nov. 19, 1996 (GB) .............................................. 9624001

(51) Int. Cl.$^7$ ................................................ H04N 7/26
(52) U.S. Cl. ................................................ 375/240.26
(58) Field of Search ................ 375/240.26; H04N 7/26

(56) References Cited

PUBLICATIONS

Bungum, O. W., "Transmultiplexing, Transcontrol and transscrambling of MPEG–2/DVB Signal", International Broadcasting Convention, Sep. 12–16, 1996, conf. publication No. 428, pp. 288–293.*

* cited by examiner

*Primary Examiner*—Howard Britton
(74) *Attorney, Agent, or Firm*—Douglas S. Rupert; Wildman, Harrold, Allen & Dixon

(57) ABSTRACT

Tables of data included in a digital stream of encoded data, e.g. a digital transport stream of a digitally compressed television signal, are modified. The tables of data are extracted from the stream and the extracted tables are processed to identify data that are to be dropped. A filter is used to filter out the identified data and new local data is entered into the extracted tables to replace dropped data and thereby form modified tables of data. The filtered stream is multiplexed with the modified tables of data to form an output digital stream. The constantly updated tables in the input stream are modified only in respect of the local changes and the updates are passed through to the output stream.

10 Claims, 2 Drawing Sheets

METHOD AND APPARATUS FOR MODIFYING TABLES OF DATA

BACKGROUND OF THE INVENTION

1) Field of the Invention

The present invention concerns a method and apparatus for modifying tables of data included in a digital stream of encoded data. The invention is of particular application to modifying the data in tables of data included in the digital transport stream of a digitally compressed television signal.

2) Description of the Related Art

An MPEG-2 digital compressed television signal contains, along with the digital encoded and compressed video and audio signal information, further information relating to the video and audio signal information. The further information is divided into two groups or categories referred to as system information (SI) and programme specific information (PSI). Within these groups or categories of information are tables of data each of which carries information about particular parameters, e.g. about the network that the signal is carried on, or about a particular service on the network or about a particular event (programme) which is being shown on that service.

Each table as presented to this invention may be broken down into sections, if it is large enough. Sections of tables each have a header identifying the type of table and therefore the type of information within the section. The actual data that the MPEG-2 decoders use is contained within descriptors inside the sections. These descriptors can be text information for display on screen, numbers, codes or links identifying the location of other tables or the location of a particular service within the transport stream. More detail is publicly available within the ISO/IEC 13818-1 MPEG-2 systems specification and ETS 300468 ETSI, SI specification and is well known to those skilled in the art. Professional and consumer receivers use the data contained in the tables to guide the decoding of the data for the viewer and to provide information such as programme guides for the viewer.

If a MPEG-2 transport stream is locally transferred from one medium to another medium, the system information and programme specific information may become inaccurate. Examples of transfers include transfers from a satellite transmission medium, to a cable or terrestrial transmission medium, or where the data rate of the transport stream is changed locally, or where services are removed locally from the transport stream. Any inaccurate information may stop MPEG-2 receiver/decoders from correctly decoding the transport stream information to display pictures and provide programme guides and any other additional services. It is therefore necessary to reflect any actual local changes with appropriate modification to the data in the SI and PSI tables.

A general overview of transmultiplexing, transcontrol and transscrambling can be found in the article entitled "Transmultiplexing, transcontrol and transscrambling of MPEG-2/DVB signal" by Bungum, O., published in International Broadcasting Convention, Sep. 12, 1996 (pages 288 to 293).

The SI and PSI tables in the MPEG-2 transport steam are subject to continuous updating changes at their source. Consequently the SI and PSI tables must not only be modified to take account of local changes but must also be transmitted to include the continuous updating changes. Furthermore as is known to those skilled in the art, the SI and PSI tables are encapsulated and encoded within the MPEG-2 transport stream with tables split into sub-tables and sections where each section is spread across several non-consecutive transport stream packets. The asynchronous nature of the information and the real-time changes in the information make its modification and transmission very difficult.

If the MPEG-2 transport stream is processed so that tables of information are replaced by new, fixed and locally generated tables, the replacement tables will contain information which is appropriate to the local changes in the transport steam but will fail to take account of continuous updating changes to the tables in the incoming transport stream.

If the MPEG-2 transport stream is processed by reading the stream into a buffer and editing all the data in real time, very significant and expensive processing power would be needed to deal with problems identifying which table to edit when the tables overlap across multiple packet boundaries.

SUMMERY OF THE INVENTION

There is therefore a need for a method and apparatus which can efficiently modify the tables of data in a stream of encoded data which can take account of continuous updating changes to the tables.

According to the present invention there is provided a method of modifying tables of data included in a digital stream of encoded data, the method comprising the steps of extracting the tables of data from the stream, processing the extracted tables to identify data which is to be dropped, filtering the stream to filter out the identified data, inserting new data into the extracted tables to replace dropped data and so forming modified tables of data, and multiplexing the transport stream with the modified tables of data.

Further, according to the present invention, there is provided apparatus for modifying tables of data included in a digital stream of encoded data, the apparatus comprising means to receive and extract tables of data from the stream, processing means to process the extracted tables to identify data which are to be dropped, filtering means to filter out the identified data from the stream, the processing means being adapted to insert new data into the extracted tables to replace dropped data and so form modified tables of data, and multiplexing means to multiplex the filtered stream with the modified tables of data.

BRIEF DESCRIPTION OF THE DRAWINGS

The invention will now be described, by way of example, with reference to the accompanying drawings in which:

Referring now to FIG. 1, there is shown, in outline form, a television transmission system including one or more encoders 10 to encode digital television signals to be multiplexed by a multiplexer 11 and modulated by a modulator 12. The modified signal in the form of an MPEG-2 digital transport stream is applied to a satellite transmission link denoted generally by the numeral 13. The satellite transmission link is connected to supply the input digital transport stream to a transcoder 14 from which transmissions may be made as terrestrial, cable, telecommunications or further satellite transmissions at the option and under the control of the operator of the transcoder.

Figure 1:
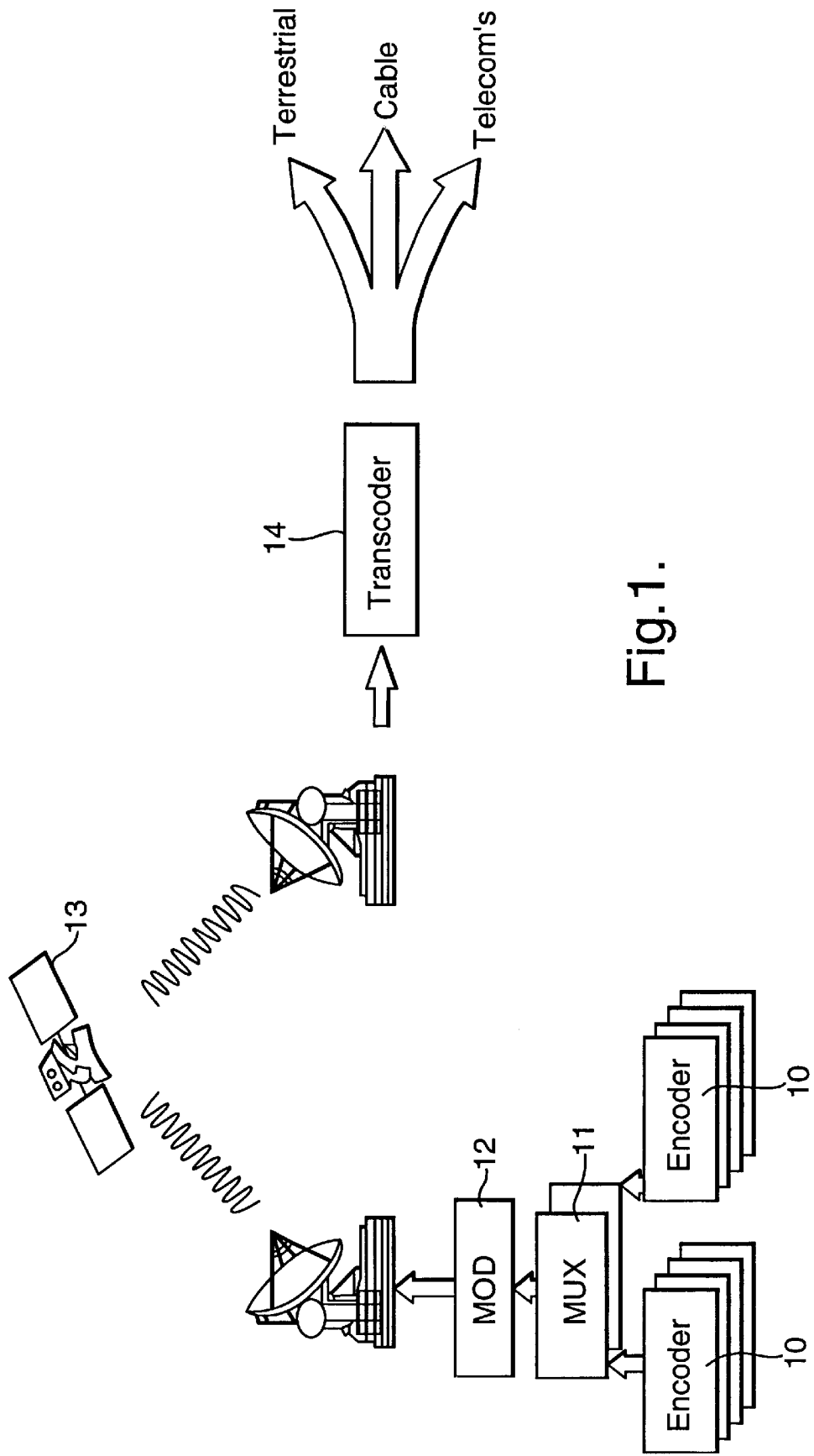
FIG. 1 shows a television transmission system including a transcoder incorporating the present invention.
Figure 2:
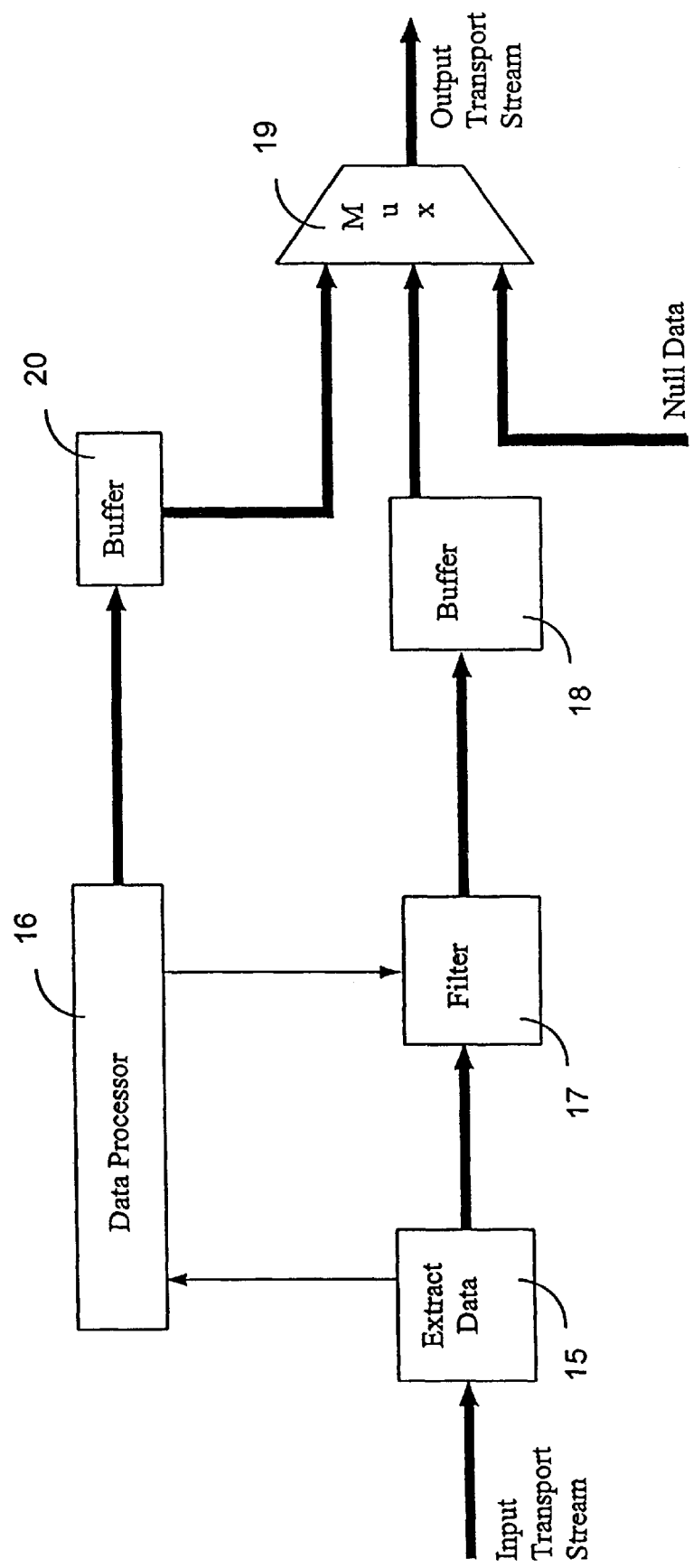
FIG. 2 shows a block flow diagram of the transcoder included in the system of FIG. 1.

The transcoder is shown in greater detail in FIG. 2. The input transport stream is applied to an extraction block 15, which includes filters responsive to the header information in each table section header to extract the tables from the input transport stream. The block 15 operates under the control of a data processor 16 to extract whole sections of tables before passing them to a memory in the form of a dynamic random access memory (DRAM). Since sections of different tables may overlap in time, the block 15 includes several filters to extract different table sections simultaneously. The processor 16 has a polling routine to decide what the filters in block 15 should look for next.

The transport stream from which tables have been extracted is passed to a filter 17 which removes packets from the transport stream that are no longer required and the incomplete transport stream passes on to a buffer 18. The output from the buffer 18 passes to a multiplexer 19 which also has an input connected to receive data from a buffer 20 and an input to receive null data. The output from the multiplexer 19 is a regenerated MPEG-2 transport stream.

To identify which packets are to be removed, the Packet Identifier (PID) of the dropped service components must be identified. The operator supplies to the processor the name of the service which he wishes to remove and the processor refers to the tables extracted by the block 15. The Service Description Table and the Programme Association Table allow the processor to get part way to the PID of the dropped service components but the processor also requires information from the Programme Map Tables which lists all the PIDs for the components in a service.

Since there are many Programme Map Tables on many different PIDs, the block 15 is unable to extract these fast enough to keep a programme map table list complete and up to date. To deal with this, the PIDs of all the Programme Map Tables are extracted from the Programme Association Table and stored as a list in the memory within the data processor 16. In real time, the PID of every packet in the transport stream is checked against this list. If a packet is recognised as a Programme Map Table packet, then it is tapped off and copied into a high speed static random access memory (SRAM) which the processor 16 can access for service component PIDs. The Programme Map Table in the high speed SRAM is always correct and does not lag the information in the transport stream. It can thus be used by the processor 16 to control the filter 17.

The data processor 16 uses information in the tables extracted from the transport stream by the block 15 and information entered by the operator to select which packets are to be removed from the transport stream and generates new reprocessed tables which are supplied to the buffer to be multiplexed with the output from the buffer 18. The regenerated transport stream takes null data to pad out the transport stream in those cases where the packets which are inserted by way of the buffer 20, are insufficient to fill the transport stream.

The system shown in FIG. 2 may not extract every possible table but may pass some of them through unchanged because of practical processing limitations.

To stop the content of unchanged tables causing problems in receiver decoders, the linking references to these unchanged tables are removed from the tables that are modified. In other words these unchanged tables are "orphaned". Because these orphaned tables are always at the bottom of a linking hierarchy, they cannot damage or corrupt information or links to information in other tables. Some descriptors inside tables that are processed are also removed to reduce processing requirements further.

In one embodiment there are two tables that are unchanged. They are the Event Information Table and the Programme Map Table. The Event Information Table contains large amounts of potentially rapidly changing data which refers to the actual schedule of events on a service. The Programme Map Table may appear on any PID and since this is one of the parameters used to filter data into memory, it would be necessary to continuously poll each PID to see if the Programme Map Table on that PID had changed and ensure that those changes were up to date in the table being newly generated.

It is to be understood that modifications could be made and that all such modifications falling within the spirit and scope of the appended claims are intended to be included in the present invention.

What is claimed is:

1. A method of modifying tables of data included in an input digital stream of encoded data, the method comprising the steps of extracting sections of tables of data from the stream, processing the extracted sections of tables to identify packets of data which is to be dropped, filtering the stream to filter out the identified packets of data, inserting new data packets into the extracted tables to replace dropped data packets and so forming modified tables of data, removing linking references to unchanged tables from the modified tables, and multiplexing the filtered stream with the modified tables of data to form an output digital stream of encoded data.

2. A method as claimed in claim 1, further comprising providing the digital stream of encoded data as a digital television signal.

3. A method as claimed in claim 1, further comprising passing unchanged further tables of data included in the digital stream into the output digital stream of encoded data.

4. A method according to claim 1, wherein the step of multiplexing the filtered stream with the modified tables of data includes incorporating null data to fill the output stream.

5. Apparatus for modifying tables of data included in a digital stream of encoded data, the apparatus comprising means to receive and extract sections of tables of data from the stream, processing means to process the extracted sections of tables to identify data which is to be dropped, filtering means to filter out the identified packets of data from the stream, the processing means being adapted to insert new data packets into the extracted tables to replace dropped data packets and so form modified tables of data, means to remove linking references to unchanged tables from the modified tables, and multiplexing means to multiplex the filtered stream with the modified tables of data to form an output digital stream of encoded data.

6. Apparatus as claimed in claim 5, adapted to modify tables of data included in an input digital stream of encoded data representing a digital television signal.

7. Apparatus as claimed in claim 5 or 6 adapted to pass further tables unchanged from the input digital stream of encoded data to the output digital stream of encoded data.

8. Apparatus as claimed in claim 1, wherein the multiplexing means are connected to receive an input of null data to fill the output stream.

9. A method as claimed in claim 1 wherein the step of processing the extracted tables includes extracting packet identifiers of all Programme Map Tables, storing the packet identifiers in a list in a memory associated with a processor, checking in real time the packet identifier of every packet in the digital stream with said list and if a packet in said digital stream is recognised as being in said list, tapping off said packet into a static random access memory for use by said processor to control a filter performing said filtering step.

10. Apparatus as claimed in claim 5, wherein the processing means is arranged to extract packet identifiers of all Programme Map Tables, storing means are provided to store the packet identifiers in a list and the processing means is arranged to check in real time the packet identifier of every packet in the digital stream with those in said list and if a packet in said digital stream is recognised as being in said list, said processor means is arranged to tap off said packet into a static random access memory for use by said processor means to control the filtering means.

* * * * *